Jan. 18, 1927.  W. T. DITCHAM  1,614,459
ELECTRICAL CONDENSER
Filed April 19, 1923
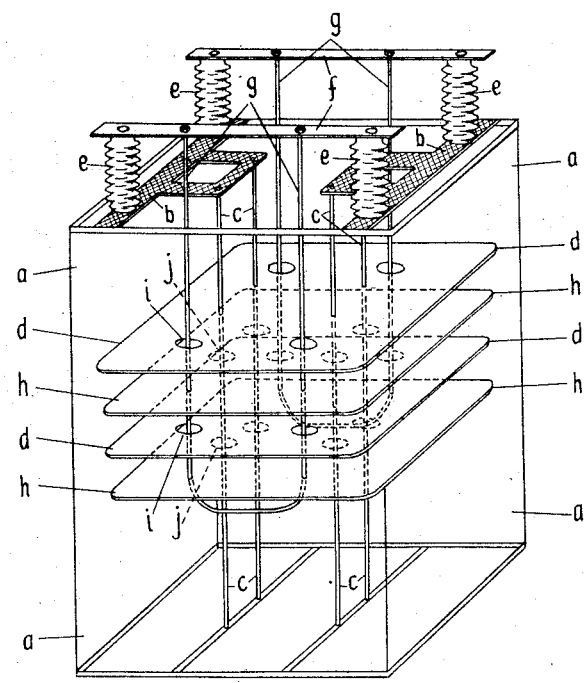
Inventor
WILLIAM T. DITCHAM
By his Attorney Patented Jan. 18, 1927.

1,614,459

UNITED STATES PATENT OFFICE.

WILLIAM THEODORE DITCHAM, OF COLCHESTER, ENGLAND, ASSIGNOR TO RADIO CORPORATION OF AMERICA, A CORPORATION OF DELAWARE.

ELECTRICAL CONDENSER.

Application filed April 19, 1923, Serial No. 633,050, and in Great Britain May 31, 1922.

This invention has for its object the construction of an electrical condenser with a liquid dielectric suitable for use with high frequency high voltage currents such as are employed, for example, in radio telegraph apparatus.

If a condenser consising of two sets of plates and separating insulators of such material as glass or porcelain, is immersed in a liquid dielectric such as oil and subjected to a high frequency voltage, it is found that the insulators, unless of dimensions out of all proportion to the distance between the plates, will break down at a potential considerably less than would be required to flash over across the oil dielectric between the plates.

According to the present invention a condenser is so constructed that while the two sets of electrodes are immersed in the liquid dielectric the insulators separating one set from the other are in the air outside the liquid.

For example, one set of electrodes is rigidly fixed inside the container of the liquid dielectric and the other set of electrodes is suspended from porcelain insulators mounted above the container in such a manner that the suspended plates hang equidistantly between the fixed plates.

My invention is illustrated by the accompanying drawing, which is a perspective view of a condenser. Across the top of the container $a$ are laid two metal bars $b$ from which depend rods $c$ carrying plates $d$. On the bars $b$ rest insulators $e$ supporting bars $f$ from which depend rods $g$ carrying plates $h$. Holes $i$ $j$ are cut in the plates $d$ $h$ respectively to allow of the passage of the rods $g$ $c$.

Having described my invention, what I claim is:

1. In a fluid dielectric condenser, a container, a condenser plate, metallic supporting means for said condenser plate carried upon said container, a second condenser plate and means for supporting said second condenser plate comprising supporting members insulatingly supported by said first mentioned supporting means.

2. In a fluid dielectric condenser, in combination, a container, a condenser plate, metallic means for supporting said plate from said container, a second condenser plate, supporting members for said second plate and means for insulatingly supporting said second supporting members from said supporting means.

3. In a fluid dielectric condenser, in combination, a container, a set of condenser plates, means for supporting said set of plates comprising metallic members supported by said container, a second set of plates, supporting means for said second set of plates comprising bars and means for supporting said bars comprising insulators resting on said first mentioned supporting means.

4. In a fluid dielectric condenser, a container, a set of condenser plates electrically connected, supporting means for said plates comprising conducting members carried by said container and provided with conducting and supporting members for positioning said plates and making electrical contact therewith, a second set of condenser plates, means for supporting said second set of condenser plates and making electrical contact therewith, comprising conducting and supporting members secured to said plates and means carried by the said first mentioned supporting members for insulatingly supporting said second set of plates therefrom.

5. In a fluid dielectric condenser, a container, a positive and a negative condenser plate within said container, a pair of metallic supporting plates mounted across the top of said container and external to the dielectric substance, a second pair of metallic plates supported by and insulated from said first named supporting plates and transverse thereto, and supporting means for the condenser plates carried by each of the said metallic supporting plates.

6. In a fluid dielectric condenser, a container, positive and negative condenser plates suspended within said container, metallic supporting means for one set of condenser plates mounted on top of said container, a metallic supporting means for the other set of condenser plates supported upon said first supporting means and insulated therefrom, a conducting member between said supporting means and alternate condenser plates, said conducting means also constituting the condenser plate supporting means suspended from the said metallic supporting means.

7. In a fluid dielectric condenser, a container, a plurality of positive and negative condenser plates, each of said plates being provided with openings and said openings arranged in staggered relationship to those of the adjacent plate, a plurality of conductor members supported from plate members mounted insulatingly from each other above the dielectric material within the container, said conductor members being positioned so as to pass freely through the center point of the openings in one set of plates and contact with the alternate set of plates, whereby one set of plates is connected to the positive supporting member and completely insulated from the negative supporting member and the alternate set of plates is connected vice versa.

WILLIAM THEODORE DITCHAM.